US010838859B2

(12) United States Patent
Saxena et al.

(10) Patent No.: US 10,838,859 B2
(45) Date of Patent: Nov. 17, 2020

(54) RECENCY BASED VICTIM BLOCK SELECTION FOR GARBAGE COLLECTION IN A SOLID STATE DEVICE (SSD)

(71) Applicant: Western Digital Technologies, Inc., San Jose, CA (US)

(72) Inventors: Vishwas Saxena, Bangalore (IN); Abhijit K. Rao, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 114 days.

(21) Appl. No.: 16/141,899

(22) Filed: Sep. 25, 2018

(65) Prior Publication Data
US 2020/0097403 A1 Mar. 26, 2020

(51) Int. Cl.
*G06F 11/14* (2006.01)
*G06F 3/06* (2006.01)
*G06F 9/455* (2018.01)
*G06F 12/02* (2006.01)

(52) U.S. Cl.
CPC .. *G06F 12/0269* (2013.01); *G06F 2212/1044* (2013.01); *G06F 2212/7205* (2013.01)

(58) Field of Classification Search
CPC ......... G06F 12/0269; G06F 2212/7205; G06F 2212/1044; G06F 2212/7201; G06F 12/0246
See application file for complete search history.

(56) References Cited

U.S. PATENT DOCUMENTS

| 8,788,778 | B1* | 7/2014 | Boyle | G06F 12/0253 |
| | | | | 711/155 |
| 8,799,561 | B2 | 8/2014 | Bux et al. | |
| 9,645,922 | B2 | 5/2017 | Ouyang et al. | |
| 9,665,482 | B2 | 5/2017 | Hada | |
| 9,678,671 | B2 | 6/2017 | Kang et al. | |

(Continued)

OTHER PUBLICATIONS

"Computer Dictionary," 1994, Microsoft Press, 2nd Edition, p. 218 (Year: 1994), definition for "interface".*

(Continued)

*Primary Examiner* — Charles Rones
*Assistant Examiner* — Tong B. Vo
(74) *Attorney, Agent, or Firm* — Loza & Loza, LLP; Gabriel Fitch

(57) ABSTRACT

Methods and apparatus for controlling garbage collection in solid state devices (SSDs) are provided. Once such apparatus includes a non-volatile memory (NVM), and a controller communicatively coupled to a host device and the NVM, and configured to calculate an invalidation factor for each of a plurality of blocks in the NVM, wherein the invalidation factor is determined based on a percentage of invalid pages in a respective block of the plurality of blocks and a most recent time of invalidation of one or more pages in the respective block; classify each block of the plurality of blocks into one of three categories based on the calculated invalidation factor; and perform a garbage collection operation for the NVM, wherein the garbage collection operation includes selecting a source block for the garbage collection operation based on the classifications of the plurality of blocks.

19 Claims, 9 Drawing Sheets

(56) References Cited

U.S. PATENT DOCUMENTS

| | | | |
|---|---|---|---|
| 2011/0264843 A1* | 10/2011 | Haines | G06F 3/0616 |
| | | | 711/103 |
| 2012/0239869 A1* | 9/2012 | Chiueh | G06F 12/0246 |
| | | | 711/103 |
| 2015/0347296 A1 | 12/2015 | Kotte et al. | |
| 2016/0179386 A1* | 6/2016 | Zhang | G06F 3/0679 |
| | | | 711/103 |
| 2016/0179399 A1 | 6/2016 | Melik-Martirosian | |
| 2017/0300410 A1 | 10/2017 | Zhang et al. | |
| 2018/0165022 A1* | 6/2018 | Tomic | G06F 11/1012 |
| 2019/0155521 A1* | 5/2019 | Bahirat | G06F 12/0868 |

OTHER PUBLICATIONS

Nam et al, "Practical Issues in Designing of Garbage Collection for Solid States Drives", Intl Journal of Future computer and Communication, vol. 2, No. 5, Oct. 2013; DOI: 10.7763/IJFCC.2013.V2. 204; pp. 451-455; http://www.ijfcc.org/papers/204-S067.pdf.
Shin, Ilhoon "Hot/Cold Clustering for Page Mapping in NAND Flash Memory", IEEE Transactions on Consumer Electronics 57(4):1728-1731; Nov. 2011; DOI 10.1109/TCE.2011/6131147; https://www.researchgate.net/publication/239766467_HotCold_Clustering_for_Page_Mapping_in_NAND_Flash_Memory.

\* cited by examiner

500

| Metablock No. (502) | VP Count (504) | Recency Time Stamp (506) |
|---|---|---|
| 0 | 10 | 12 |
| 1 | 20 | 20 |
| 2 | 22 | 48 |
| 3 | 25 | 56 |
| 4 | 14 | 64 |
| 5 | 33 | 48 |
| 6 | 50 | 1 |
| 7 | 2 | 8 |
| ... | ... | ... |
| 100 | 24 | 104 |
| 101 | 30 | 1 |

RECENCY BASED VICTIM BLOCK SELECTION FOR GARBAGE COLLECTION IN A SOLID STATE DEVICE (SSD)

FIELD

The present disclosure relates generally to data storage devices, and more specifically, to methods and apparatus for controlling garbage collection in solid state devices (SSDs).

INTRODUCTION

In a variety of consumer electronics, SSDs incorporating non-volatile memory (NVM) are being more frequently utilized. This non-volatile memory may include one or more flash memory devices, such as NAND flash memory devices, and the flash memory devices may be logically divided into blocks with each of the blocks further divided into logically addressable pages.

NAND flash memory is erasable at the block level, and programmed (i.e., written to) or read at the page level. A page in an SSD cannot be directly overwritten until the block containing the page has first been erased, which erases the data in other pages within the same block. Because of the inherent inability to write over old data in NAND flash at the page level, valid pages may be moved to another block in the NAND flash to facilitate block erasure, thereby rendering the previous data invalid. Due to accumulation of invalid data, a process known as "Garbage Collection" (GC) becomes a necessary task to be implemented by a controller controlling an SSD, and, in particular, part of a Flash Translation Layer (FTL) or FTL circuit that is part of the SSD controller. As a block is the smallest erasure unit of NAND flash memories, garbage collection includes copying valid data from a source or victim block to a new destination block and then eventually erasing the remaining invalid source or victim block. In FTL architectures, mechanisms to select the right source or victim block may be based on the number of valid pages in the block (i.e., valid page count), as such mechanisms may require minimal processing to determine the available valid pages in a free block. These mechanisms, however, may not be optimal for selecting a source or victim block depending on the host data pattern, such as in the case of a self-invalidating data pattern. For example, frequently invalidated blocks (i.e., "hot blocks"), and especially frequently invalidated blocks that have been invalided in the recent past, may not be the best source/victim blocks, whereas less frequently invalidated blocks (i.e., "cold blocks") may be better suited for selection as victim blocks.

SUMMARY

In one aspect, this disclosure relates to a data storage apparatus comprising a non-volatile memory (NVM), and a controller communicatively coupled to a host device and the NVM, and configured to calculate an invalidation factor for each of a plurality of blocks in the NVM, wherein the invalidation factor is determined based on a percentage of invalid pages in a respective block of the plurality of blocks and a most recent time of invalidation of one or more pages in the respective block; classify each block of the plurality of blocks into one of three categories based on the calculated invalidation factor; and perform a garbage collection operation for the NVM, wherein the garbage collection operation includes selecting a source block for the garbage collection operation based on the classifications of the plurality of blocks.

In another aspect, this disclosure relates to an apparatus comprising means for determining an invalidation factor for each block in a plurality of blocks in a non-volatile memory (NVM), wherein the invalidation factor is determined based on a percentage of invalid pages in a respective block and a latest time of invalidation of one or more pages in the respective block; means for classifying the plurality of blocks into two or more categories including cold and hot blocks that may be used as a source block for a garbage collection operation, where classifying the plurality of blocks is based on the respective invalidation factors for each block; and means for garbage collection that selects a block as the source block for garbage collection from the plurality of blocks from the two or more categories of blocks in an order from cold to hot blocks.

In yet another aspect, this disclosure relates to a method comprising determining an invalidation factor for each block in a plurality of blocks in a non-volatile memory (NVM), wherein the invalidation factor is determined based on a number of invalid pages in a respective block and a time of invalidation of one or more pages in the block; sorting the plurality of blocks into two or more categories indicating a respective degree of desirability of the block to be used as a source block for a garbage collection operation, where the sorting is based on the respective invalidation factors for each block; and performing a garbage collection operation on the NVM including selecting a block as the source block for garbage collection from the plurality of blocks from the two or more categories of blocks in an order from a most desirable category to a least desirable category.

In yet another aspect, this disclosure relates to an apparatus for controlling a non-volatile memory device, comprising an interface to the non-volatile memory device, and a processor coupled to the interface and configured to calculate an invalidation factor for each block in a plurality of blocks in a non-volatile memory (NVM), wherein the invalidation factor is calculated based on a number of invalid pages in a respective block and a most recent time of invalidation of a page in the respective block; and categorize the plurality of blocks into two or more categorizations indicating a respective degree of desirability of the block to be used as a source block for a garbage collection operation, where the two or more categorizations are based on the respective invalidation factors for each block.

BRIEF DESCRIPTION OF THE DRAWINGS

FIG. 5 illustrates an exemplary recency table used in accordance with aspects of the present disclosure.

DETAILED DESCRIPTION

The present disclosure provides methods and apparatus for control or management of an NVM device where source or victim block selection as part of a garbage collection (GC) operation by a Flash Translation Layer (FTL), for example, is based on both a percentage of invalid pages and the recentness of invalidation of blocks. The combination of these two factors is termed herein as an "invalidation factor." Based on the invalidation factor, blocks may be more accurately categorized into hot, warm, and cold source or victim blocks and the GC operation may then be configured to choose victim blocks in the order of cold, warm, and hot blocks. This process provides an improvement over merely selecting victim blocks based on a valid page count in a block.

Figure 1:
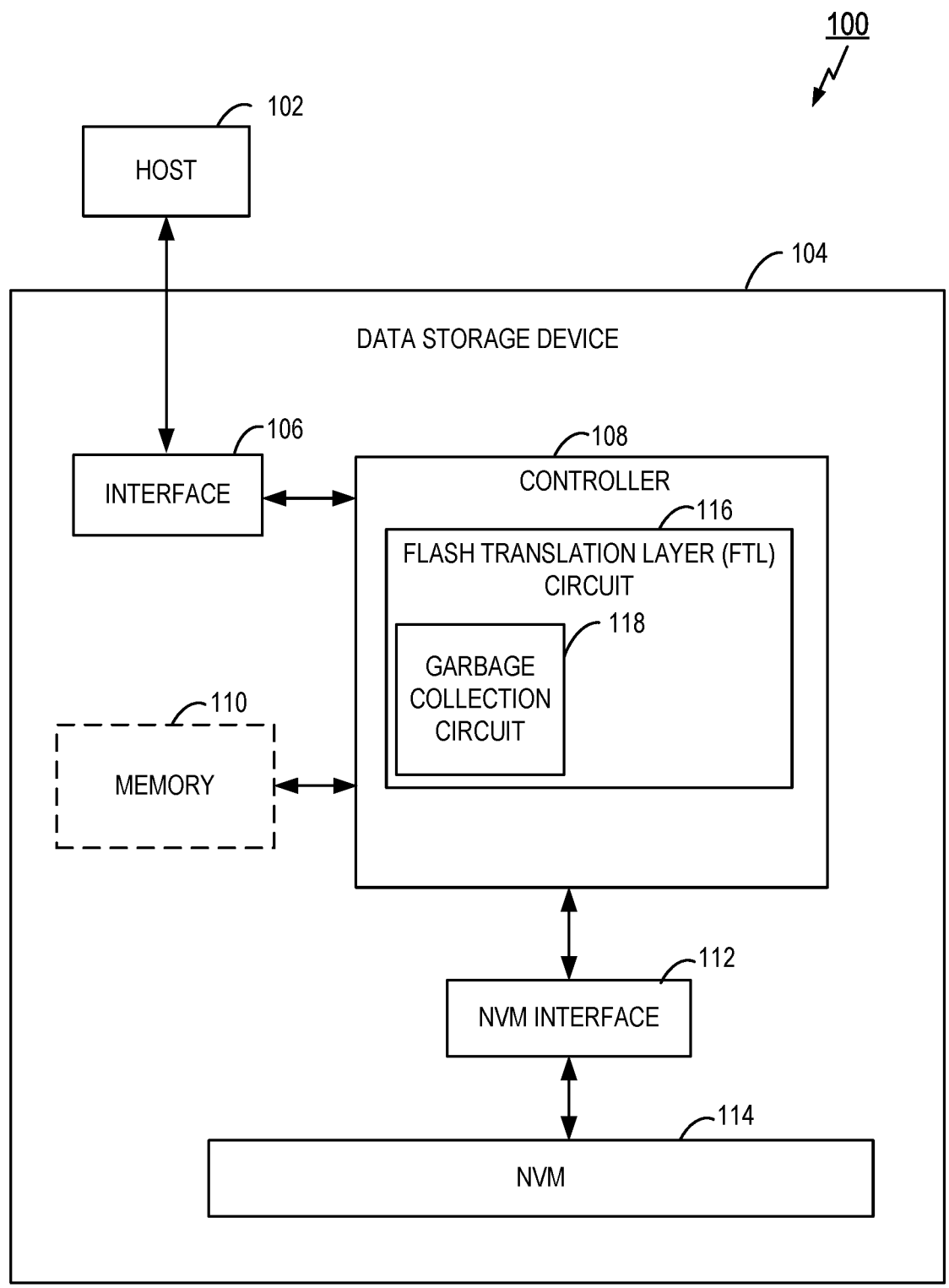
FIG. 1 is a block diagram of an exemplary data storage device system in which the presently disclosed methods and apparatus may be implemented.

Referring to the drawings, FIG. 1 is a block diagram of a system 100 including an exemplary data storage device in which the disclosed FTL control or management may be implemented in accordance with aspects of the disclosure. The system 100 includes a host 102 and a data storage device 104 coupled to the host 102. According to certain aspects, the data storage device 104 may be implemented as a solid-state device (SSD) including NVMs such as NAND flash memory, or as a compact flash express (CFX) drive, as a couple of examples. The host 102 provides commands to the data storage device 104 for transferring data between the host 102 and the data storage device 104. For example, the host 102 may provide a write command to the data storage device 104 for writing data to the data storage device 104 or a read command to the data storage device 104 for reading data from the data storage device 104. The host 102 may be any system or device having a need for data storage or retrieval and a compatible interface for communicating with the data storage device 104. For example, the host 102 may a computing device, a personal computer, a portable computer, a workstation, a server, a personal digital assistant, a digital camera, or a digital phone as merely a few examples.

The data storage device 104 includes a host interface 106, a controller 108 (or alternatively, an NVM controller 108), which also includes an FTL circuit 116, a memory 110 such as random access memory (RAM) or an FTL memory 110, a non-volatile memory (NVM) interface 112 (which may also be referred to as a Flash memory interface), and a non-volatile memory (NVM) array 114, such as a NAND Flash memory, for example. The host interface 106 is coupled to the controller 108 and facilitates communication between the host 102 and the controller 108. Additionally, the controller 108 is coupled to the RAM memory 110 as well as the NVM 114 via the NVM interface 112. The host interface 106 may be any type of communication interface, such as an NVMe interface, an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the data storage device 104. In other embodiments, the data storage device 104 is remote with respect to the host 102 or is contained in a remote computing system communicatively coupled with the host 102. For example, the host 102 may communicate with the data storage device 104 through a wireless communication link.

The controller 108 controls operation of the data storage device 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a processor, microprocessor, a microcontroller, an embedded controller, a logic circuit, software, firmware, or the like, for controlling operation of the data storage device 104. In some aspects, some or all of the functions described herein as being performed by the controller 108 may instead be performed by another element of the data storage device 104. For example, the data storage device 104 may include a processor, microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory.

The NVM 114 receives data writes or data reads from the NVM controller 108 via the NVM interface 112 and either stores or reads out the data, accordingly. The NVM 114 may be any type of non-volatile memory, such as a flash storage system, a NAND-type flash memory, a solid state drive, a flash memory card, a secure digital (SD) card, a universal serial bus (USB) memory device, a SmartMedia device, a flash storage array, or the like.

In a further aspect, the FTL circuit 116 may include a garbage collector or recycle circuit 118 that copies valid data into new or free areas and erases invalid data in physical block locations of the NVM 114 in order to free this invalid memory space, as will be discussed in further detail later. The process of freeing pages or blocks and erasing data includes the process of recycle writes where the block or page is written to because flash memory is write-once type memory where existing data cannot simply be directly overwritten. Rather, a newer version of the data will be written to an available space elsewhere and the older version of the data is then invalidated and considered to be dead. The process of garbage collection recycles the space occupied by the invalid or dead data locations.

Figure 2:
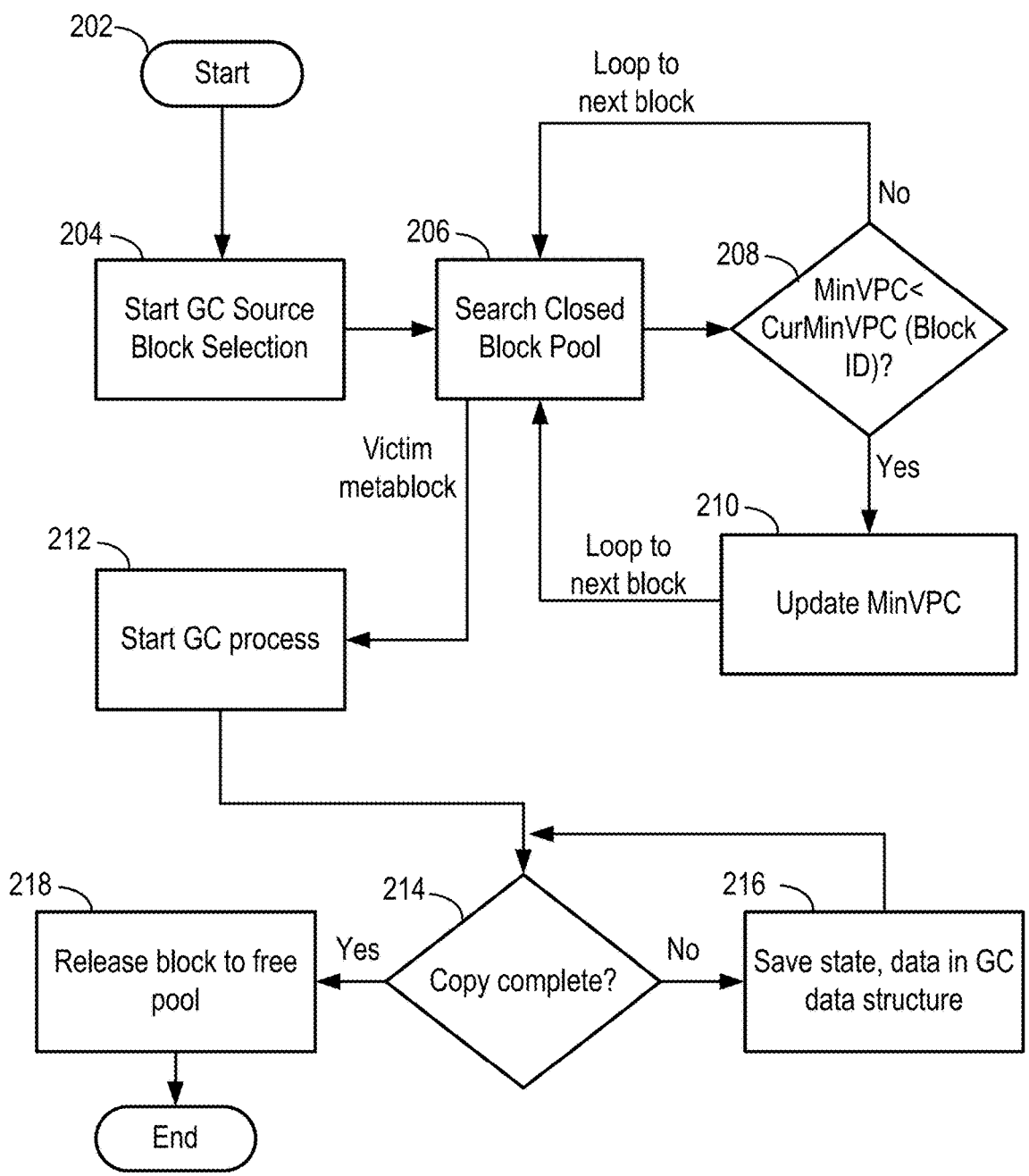
FIG. 2 is a flow diagram of a process for managing a data storage device including a non-volatile memory (NVM) device.

FIG. 2 is a flow diagram of a method 200 for management of a data storage device. The method 200 includes a source or victim block selection process used in conjunction with a garbage collection (GC) operation that may be implemented for an NVM device. The process 200 includes victim block selection and garbage collection processes. As illustrated, method 200 starts as shown at block 202, after which the process 200 enters a garbage collection victim block selection operation as illustrated at block 204, where the block selection process includes the processes of blocks 206, 208, and 210 as shown in FIG. 2. In particular, the block selection process of blocks 204, 206, 208, and 210 includes determining or selecting a best source or victim block from which to copy remaining valid data based on valid pages in the closed block.

As shown in FIG. 2, the victim block selection process includes a process illustrated in block 206 of searching a closed block pool. This search is an iterative process in which a data storage device controller (e.g., controller 108 in FIG. 1), for example, and more particularly a garbage collector circuit (e.g., circuit 118) sequentially examines each of the closed blocks in the closed block pool by determining whether a minimum valid page count (Min-ValidPageCount or MinVPC) is less than a current MinVPC as illustrated by decision block 208. The purpose of this examination is to determine which block in the pool of blocks has lowest valid page count. Each time the decision at block 208 finds a block having a MinVPC less than the current MinVPC, the MinVPC value is updated as shown by block 210. It is noted here that a closed block pool is a collection of blocks (e.g., closed blocks) that have been termed as physically or logically closed. A block is physically closed if all the pages in the blocks have been written or the block has been fully programmed. Correlatively, a block is a logically closed block if the last write offset of the block is set to the block size, which indicates that no more additional writes are possible. Furthermore, it is noted that garbage collection operations are typically performed on closed blocks.

After the processes of blocks 204, 206, 208, and 210 are completed and a source or victim block has been determined thereby, flow proceeds to block 212 to start the actual garbage collection copy process using the determined victim block. It is noted here that, in certain aspects, the selected source or victim block may be a metablock. It is further noted that the concept of a "metablock" is a linking of two or more individual physical blocks to be erased to form virtual blocks that may be identified by a common logical block address as a destination for programming (i.e., writing) and reading of data. Thus, a metablock may be formed from several individual physical blocks spread over several dies that are virtually interconnected to form a single large block to enable or provide parallelism for writes and reads. For example, an SSD controller may perform parallel reads or writes by writing to the metablock.

During the copy process started in block 212, it is noted that such process may not necessarily be performed in a single, continuous operation, and therefore method 200 may then further include determining whether the copying process is completed as shown by decision block 214. If the copying is not completed, the GC operation may save the state of the copying process as shown in block 216, and then continue at a later time to recheck whether copying is complete. When copying is completed as determined in decision block 214, the closed block pool is released as illustrated in block 218.

It is noted that method 200 does not account for how recently pages within a block were invalidated. For example, if there has been a recent invalidation, there is a chance that the block may be invalidated soon by a host pattern. Hence, identifying blocks that have a higher chance of getting invalidated due to an oncoming host pattern may be beneficial, as will be discussed below.

When the data in a NAND flash memory chip is modified, an out-of-place update writes the new data to the free blocks and invalidates the pages containing the original data by marking them as dead or invalid. Over time, the garbage in terms of invalid pages rises and the free space of NAND flash memory gradually reduces. When the amount of free space falls below a predetermined threshold, the garbage collection scheme may then be executed or performed to reclaim the garbage (that is the invalid pages/blocks) and obtain free space for the NAND flash memory.

Figure 3:
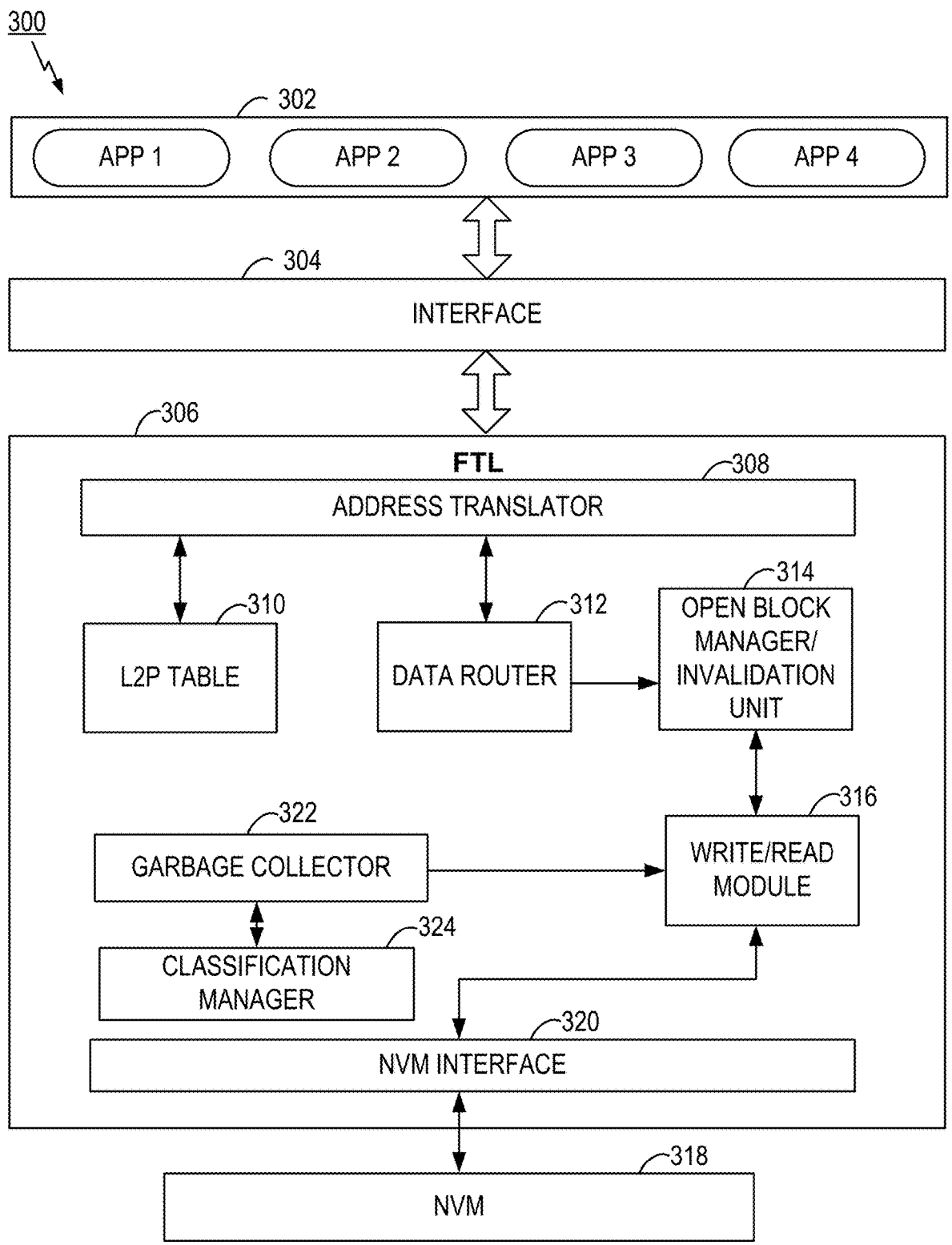
FIG. 3 illustrates a block diagram of a system including an NVM memory device in which the presently disclosed methods and apparatus may be utilized.

FIG. 3 illustrates another block diagram of a system 300 including an NVM memory device in which the presently disclosed methods and apparatus may be utilized. The system 300 particularly illustrates an exemplary FTL architecture or circuit that effects the presently disclosed methodology. As illustrated, the system 300 includes a host device 302, which may run any number of applications/software that will effect writes and reads from memory. In the illustrated example, four applications are shown running (APP1-APP4) on the host device 302. The system 300 also includes an interface 304, which may include file systems, block drivers, and a host interface manager but shown collectively at block 304, and which is coupled between the host device 302 and a flash translation layer 306, which may be part of a data storage device controller, such a controller 108 in FIG. 1.

The FTL 306 includes an address translator 308 that serves to translate addresses for host writes and reads from logical addresses to physical addresses with the assistance of a logical-to-physical (L2P) table 310. The FTL 306 also includes a data router 312 for determining routing for reads/writes and an open block manager/invalidation unit or circuit 314 that manages open blocks in the memory, as well as managing invalidations of pages in blocks.

A write/read module 316 serves to perform the writes to and reads from a memory or flash memory array 318 via a lower level layer/interface 320. Further, the FTL includes a garbage collector 322 that effectuates the garbage collection operation. In an aspect, the garbage collector 322 is configured for selecting source or victim blocks, including selection based on an invalidation factor, which will be discussed in further detail below. According to other aspects, the garbage collection process is configured to perform victim selection on the basis of metablocks, which is a logical block formed from several individual physical blocks spread over several dies in the flash memory 318 that are interconnected to form a single large block to enable parallelism in writes and reads.

Figure 4:
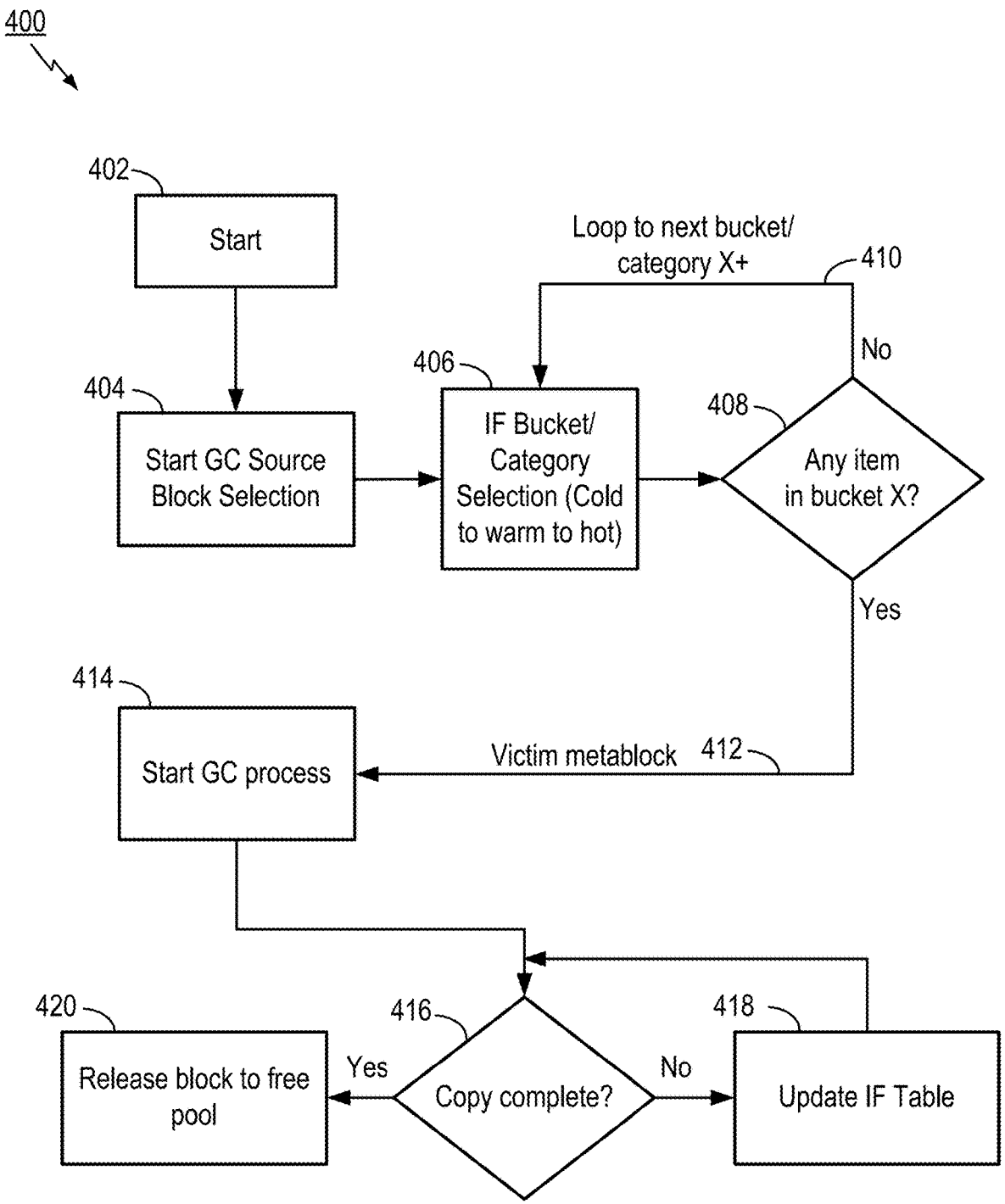
FIG. 4 is a flow diagram of an exemplary method including a victim block selection process utilizing an invalidation factor in accordance with aspects of the present disclosure.

FIG. 4 illustrates a method 400 featuring the performance of garbage collection including the calculation and utilization of an invalidation factor (IF) for the selection of a source or victim block. The method 400 includes a block 402 where the garbage collection operation is started, which may be implemented by a garbage collector circuit in a data storage device controller (e.g., 108 and further an FTL circuit 118 as another example, or garbage collector 322 shown in FIG. 3). Next, flow continues to the source or victim block selection process that begins at block 404 and includes the processes of blocks 406 and 408, which will be discussed below. The process started at block 404 may include the calculation of an invalidation factor (IF) or reference previously calculated IF values for blocks (e.g., metablocks). It is noted that the process of calculating the IF values is based on the percentage of invalid pages in a block or metablock, and the time of the most recent invalidation of a page in the block or metablock, and will be discussed in more detail with respect to FIGS. 5 and 6.

At blocks 406 and 408, the source or victim block selection process further includes sorting or selecting the blocks into categories or buckets dependent on the calculated IF values of the blocks for the purpose of identifying optimal or desirable blocks that may be used as the source block for garbage collection. In an aspect, the blocks may be categorized into at least two "hot" or "cold" categories, categorizations, or buckets based on the IF values, where the hot blocks have a higher degree of access by a host, for example, where they are more frequently accessed, whereas cold blocks are less frequently accessed. In other aspects, further gradations are also possible where the blocks are classified into hot, warm, and cold blocks, with respective degrees of read/write access from most frequently accessed to least frequently accessed. It is noted that the IF values and their respective categories or buckets may be predetermined or pre-calculated, wherein such processes are not explicitly shown in FIG. 4, but are considered as a priori data for the method 400. The determination of whether blocks fall into hot, warm, or cold block categories is based on determined IF values and a comparison thereof to predetermined values or ranges of values preselected for categorizing particular IF values into these respective categories.

At decision block 406 a determination is made for selecting blocks from a first "X" category or bucket. In a particular, implementation, the cold block category or categorization is considered first as cold blocks, followed by the warm category, and last by the hot category, as cold block are the most desirable block for use as a source or victim block for garbage collection as warm or hot blocks are more likely to be invalidated more frequently. The intention of such categorization is to avoid targeting hot blocks for selection as the source block, as these more frequently accessed blocks typically will have a higher chance for self-invalidation, whereas warm or cold blocks will have a greater chance to not be invalidated in the near future.

At block 408 in FIG. 4, a determination is made whether a particular block's categorization meets an "X" category or bucket where X is either hot, warm, or cold. In an aspect, the cold category is selected first and the process of blocks 406 and 408, and the looping back from block 408 to block 406 (See loop 410) serve to first determine if any blocks are categorized as "cold" and, if so, that these block are selected for treatment as a source or victim block for garbage control operation. Thus, if no block is categorized as "cold" the processes of block 406 and 408 then effectuate checking a next desirable category (e.g., warm blocks) as indicated by loop 410 where the checking proceeds to a next bucket or category (e.g. X+), and then a least desirable category (e.g., hot blocks). In an aspect, it is noted that the garbage collector circuit 322 in FIG. 3 may have an associated classification unit, circuit, or manager 324 that is used to determine the hot, warm, or cold categories based on the IF values stored in an IF table, which will be discussed in more detail later.

Once a determination is made that a block meets the current category condition of block 408, a source or victim block is selected as shown by arrow 412 and flow proceeds to block 414 where a garbage collection process starts with the determined source or victim block, and copying the contents thereof to another free block, where the garbage collection process includes the processes of blocks 416, 418, and 420. After copying starts in block 414, flow proceeds to decision block 416, where a determination is made whether copying of the block has been completed. In the method 400, if the copying is not yet complete, an Invalidation Factor Table is updated as shown at block 418 where the Invalidation Factor is maintained as part of the IF table for all closed block lists. It is noted that this table is dynamically sized as there may be variation in the closed block count, and the size of the IF table depends on the number of closed blocks. In an aspect, the IF table may be configured as a sorted table that has an IF value for a corresponding closed metablock. Also, the IF table may be dynamically sized as there is normally variation in the closed block count. The size of the IF table will depend on the number of closed blocks. Moreover, the IF may be sorted from highest to lowest IF metablocks. Accordingly, the garbage collection process can always pick the block at the top of the IF table. The cold blocks will have a relatively higher IF value as the recency factor for cold blocks is higher than for warm or hot blocks.

Of further note, the IF table may be sorted to place a metablock with the highest IF value at the top the table listing (i.e., in order of most desirable to least desirable), as cold blocks will have relatively higher IF values as the recency factor for cold blocks is higher than for warm and hot blocks, as will be discussed in more detail below. Alternatively, when copying is completed as determined in decision block 416, the closed block pool is released as illustrated in block 420. Of yet further note, during operation of the firmware, the IF table may be stored in RAM (e.g., RAM 110 in FIG. 1). Use of RAM avoids expensive flash page reads and speeds up the computation. When the memory device is power off or during explicit log flush, however, IF table may be written in the NVM or Flash memory (e.g., NVM 318). On every power on, the IF table from the log page (i.e., the read from Flash) would be loaded onto the RAM.

As discussed before, the Invalidation Factor (IF) is a combination or product of the percentage of invalid pages in a block and the last or latest invalidation time of the block, which is also referred to herein as the recentness or "recency" of invalidation. In an aspect, the IF may be determined according to the following equation (1):

$$\text{Invalidation Factor (IF)} = \text{IPP(MetaBlockID)} * \Delta \text{RI(MetablockID)} \qquad (1)$$

where IPP is an Invalid Page Percentage that is determined by the following equation (2):

$$\text{IPP} = (\text{No. of Invalid Pages in Block/No. Total blocks in the Block}) * 100 \qquad (2)$$

where $\Delta$RI is the Recency of Invalidation (or RI), which is a timestamp (TS) based measurement for a particular metablock. In particular, the timestamp is a difference or delta between a current system time of a memory device and a most recent time of invalidation of the metablock (i.e., $\Delta$RI(MetablockID)=(SystemTime−InvalidationTS(MetablockID)). Accordingly, the RI will be smaller for recently invalidated blocks (e.g., hot blocks) and larger for less frequently invalidated blocks (e.g., cold blocks); i.e., Cold block RI>Warm block RI>Hot block RI. In a further aspect, it is noted that the timestamp may be obtained through the use of a system timer of a memory device.

Upon invalidation of a page in the block, the ΔRI(Metablock) is updated in a valid page and recency table or similar construct, an example of which is illustrated in FIG. 5. Of note, during operation of the firmware, the valid page and recency table may be stored in RAM (e.g., RAM 110 in FIG. 1). Use of RAM avoids expensive flash page reads and speeds up the computation. When the device is power off or during explicit log flush, however, the valid page and recency table is written in Flash. On every power on, the valid page and recency table would again be loaded onto the RAM memory. In yet a further aspect, it is noted that table 500 may be part of the IF table discussed above.

As shown in FIG. 5, an exemplary valid page and recency table 500 includes a first column 502 with the metablock numbers, and second and third columns 504 and 506 respectively containing the a valid page (VP) count of the number of valid pages for each of the metablocks in the system, and a recency time stamp of the last invalidation of the metablock. During IF calculation, both the VP count and time stamp information from table 500 are accessed when performing the calculations of equations (1) and (2) above.

Figure 6:
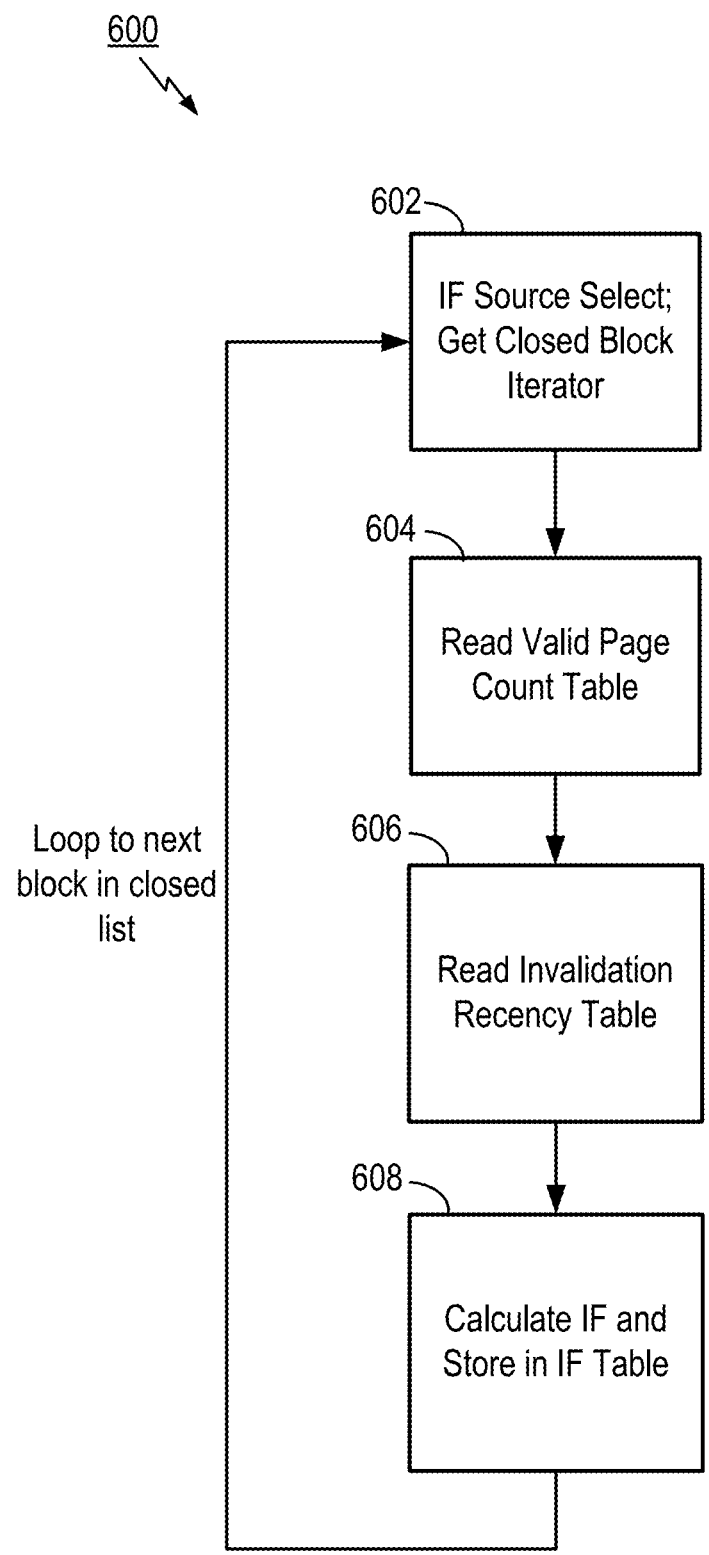
FIG. 6 illustrates a flow diagram of an exemplary method for determining an invalidation factor (IF) in accordance with aspects of the present disclosure.

With regard to the process of calculating the IF, FIG. 6 illustrates an exemplary method 600 for determining the invalidation factor, which may be implemented by the FTL as one example. It is noted that the IF values for metablocks are calculated before the source selection in garbage collection process, such as the process of FIG. 4. Of further note, the FTL maintains an invalidation factor table (IF table) of the calculated IF values for all closed metablocks that will be part of the log structure stored in NAND memory, but during operation of the IF calculation method 600 by the FTL, this table may also be temporarily stored in RAM memory (e.g., 110 in FIG. 1) for quicker computation during operation of the firmware. It is noted that the log structure is a data structure for the log, which describes the components of the log. Whenever the log is written to the Flash memory it is written in the form of log pages to a log block in the flash memory.

Method 600 starts with obtaining an iterator for a closed block list as shown in block 602, where a number of blocks therein may be considered or selected for IF value calculation. Once a particular block is selected, the flow moves to block 604 where a valid page count is read from the valid page and recency table 500 for the particular selected metablock; namely from column 504. Further, the flow moves to block 606 where the recency of invalidation is also read from the valid page and recency table 500 for the particular selected metablock; namely from column 506.

Next, flow proceeds to block 608 where the IF values is calculated for the particular selected block according to equations (1) and (2) above, and the result is saved in the IF table. If all of the metablocks within the closed block list have not yet been considered, then flow loops back to block 602 to select the next block in the closed block list. In a further aspect, the process of block 608 may further include sorting or organizing the IF table in a linear order, such as ordering from the highest IF to the lowest IF (i.e., from the coldest to hottest potential source or victim blocks). Thus, when a source or victim block is selected during a garbage collection process, the algorithm starts with the first or highest entry in the table and moves sequentially down in the table to the next, second highest IF value, and so forth.

Figure 7:
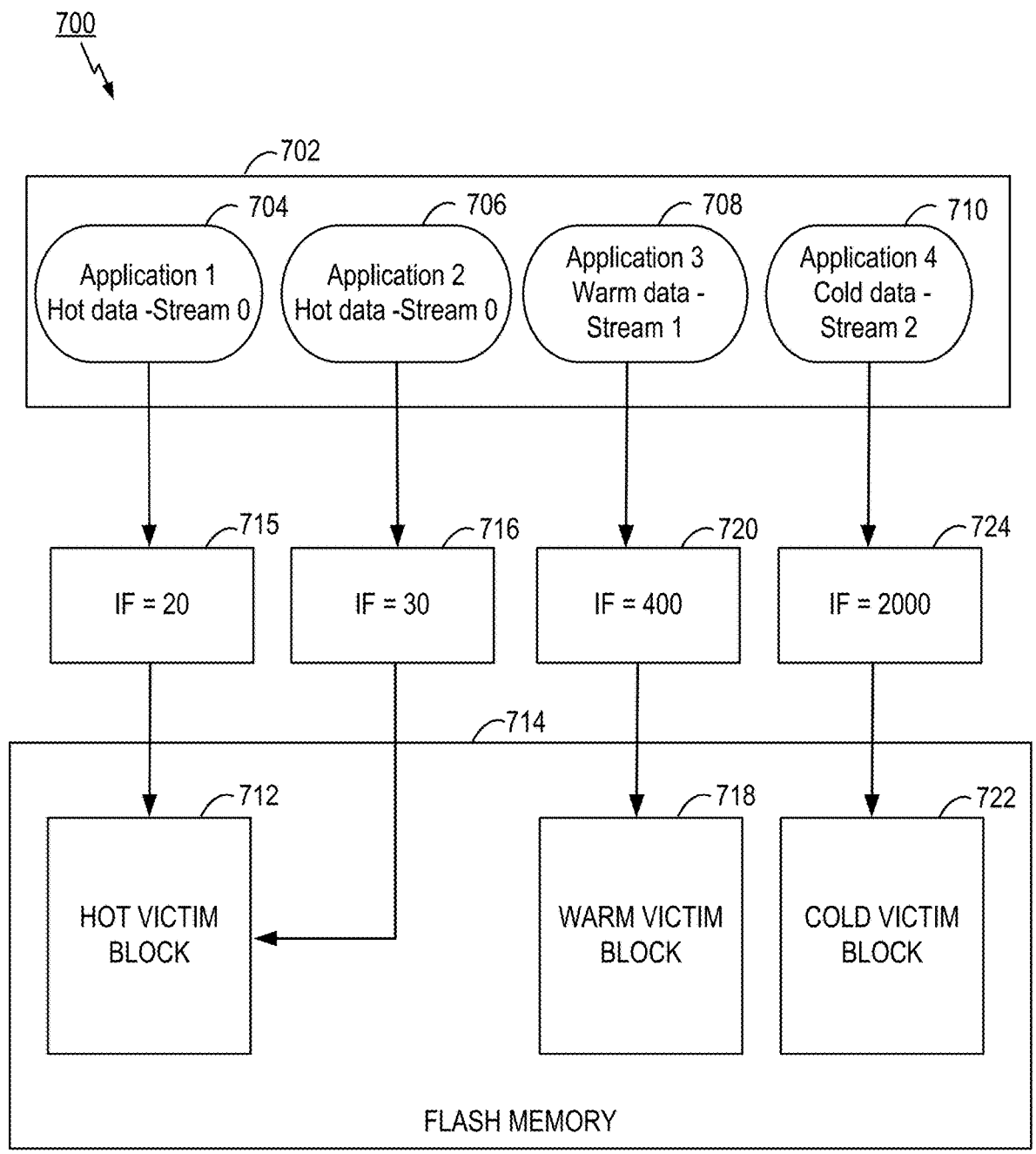
FIG. 7 is a block diagram of an exemplary IF selection for various applications in a host according to aspects of the present disclosure.

FIG. 7 illustrates a block diagram 700 of exemplary IF selection criteria per various applications/data streams in a host according to aspects of the present disclosure. Based on IF value, the closed metablocks are grouped into the three categories or buckets for source selection in garbage collection, such that there are Hot IFs, Warm IFs, and Cold IFs. The priority of choosing the source or victims blocks is made according to the following order: Cold IFs before Warm IFs before Hot IFs, or, in other words, greatest to least IF values. In the example of FIG. 7, a host device 702 is shown running four different applications Application 1 through Application 4, which are respectively numbered 704, 706, 708, and 710 in the figure. For purposes of example, the different applications are shown have different frequency of memory access (i.e., hot, warm, or cold data streams). For example, Applications 1 and 2 (704, 706) are shown as having a high frequency of memory access; i.e., a hot data stream 0. The IF values of a block 712 in a flash memory 714 being accessed more frequently by Application 1, may yield an IF value of 20, for example, as illustrated in block 715, or 30 as illustrated in block 716 when being accessed by Application 2.

For example, Applications 1 and 2 (704, 706) are shown as having a high frequency of memory access; i.e., a hot data stream 0. The IF values of a block 712 in a flash memory 714 being accessed more frequently by Application 1, may yield an IF value of 20, for example, as illustrated in block 715, or 30 as illustrated in block 716 when being accessed by Application 2. In the example of Application 3 (708), which is shown having a medium or warm frequency of memory access; i.e., a warm data stream 1, the IF value of a block 718 in flash memory 714 when being accessed by Application 3, may yield an IF value of 400, for example, as illustrated in block 720. Furthermore, in the example of Application 4 (710), assuming this application has a low degree or frequency of access of a block 722 (i.e., a cold data stream 2), the IF value will be high, such as 2000 as shown in block 724. In the application of the garbage collection process shown in FIG. 4, it is most likely that block 724, being the coldest block, would be selected as the source or victim block.

Figure 8:
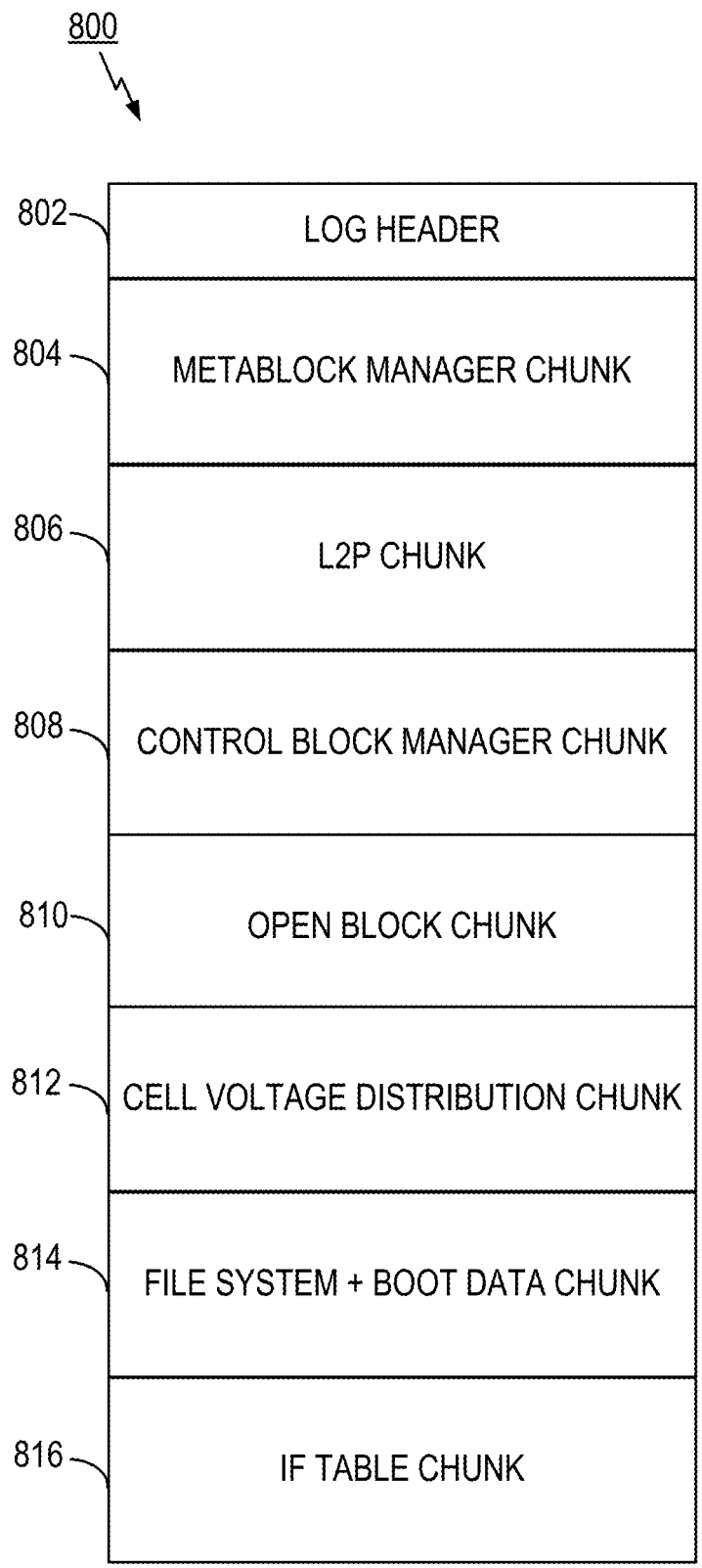
FIG. 8 illustrates an exemplary log block that may be utilized in accordance with aspects of the present disclosure.

FIG. 8 illustrates an exemplary log block or page 800 that may be utilized in accordance with aspects of the present disclosure where the log block or page 800 contains various logged data, such as control data and/or metadata that may be stored and accessed by the FTL. In particular, an FTL may be configured to dump logged control data and/or metadata to the flash memory in the form of a log block or page 800, which captures the state of the log or system at different time intervals. In certain aspects, a metadata log may hold control data of all the modules in the system such as the Logical to Physical (L2P) table (e.g., 310), the Block Manager module (e.g., 314), the garbage collector circuit (e.g., 322), Wear Levelling, Initialization, Open Block, File System, Read Scrub, or a power on reset (POR), as examples In accordance with aspects of the present disclosure, the log block 800 may include a log header 802, a metablock manager chunk, an L2P chunk 806, a control block manager chunk 808, an open block chunk 810, a cell voltage distribution chunk 812, a file system and boot data chunk 814, and an IF table chuck 816, which is added for purposes of the presently disclosed apparatus and methods. It is noted, however, that the log itself is always resident in the RAM, and, in certain aspects, the entire IF table may be always part of the RAM and updating does not require flash reads from the flash memory.

As discussed earlier with respect to method 400 in FIG. 4, candidate source or victim blocks are grouped into three categories or buckets: hot, warm and cold. As also discussed above in connection with FIG. 4, the garbage collection process chooses the blocks in the bucket order of cold to warm to hot. In some aspects, because the present methodology is configured to choose cold blocks first over warm or hot blocks, it is noted that the hot blocks will be subject to invalidation when rewrites happen due to the resultant grouping of hot data into a single block over time. Hence, while cold blocks will almost always be subjected to garbage collection under the present scheme, garbage collection for hot blocks can be avoided, which advantageously serves to reduce the overall write amplification (WA) where WA= (Total Host Data(X)+GC_Data_Movement(Y))/Total host data. Thus, in the current scheme garbage collection for hot data may be totally excluded, where only garbage collection from cold blocks will be included in the value GC_Data_Movement(Y). Accordingly, assuming that 50% of the closed blocks are hot blocks and the remaining 50% are cold blocks, the write amplification in such case may be determined according to following equation (3):

$$WA=Total\_Host\_Data+GC\_Data(Cold)/Total\ host\ data \quad (3)$$

Assuming normalized values, if the total host data is a value of 1, and GC_Data(Cold) value is a quarter of the total (i.e., 0.25), the WA value would be 1.25. In known schemes where the GC_Data would include the other 50% of the garbage collection data (i.e., the GC_Data value is 2×0.25 or 0.5), the WA value would be 1.5. Thus, in this example the disclosed methods and apparatus would provide a 16.66% improvement (i.e., decrease) of the WA over conventionally known schemes (i.e., (1.5-1.25)/1.5×100).

Figure 9:
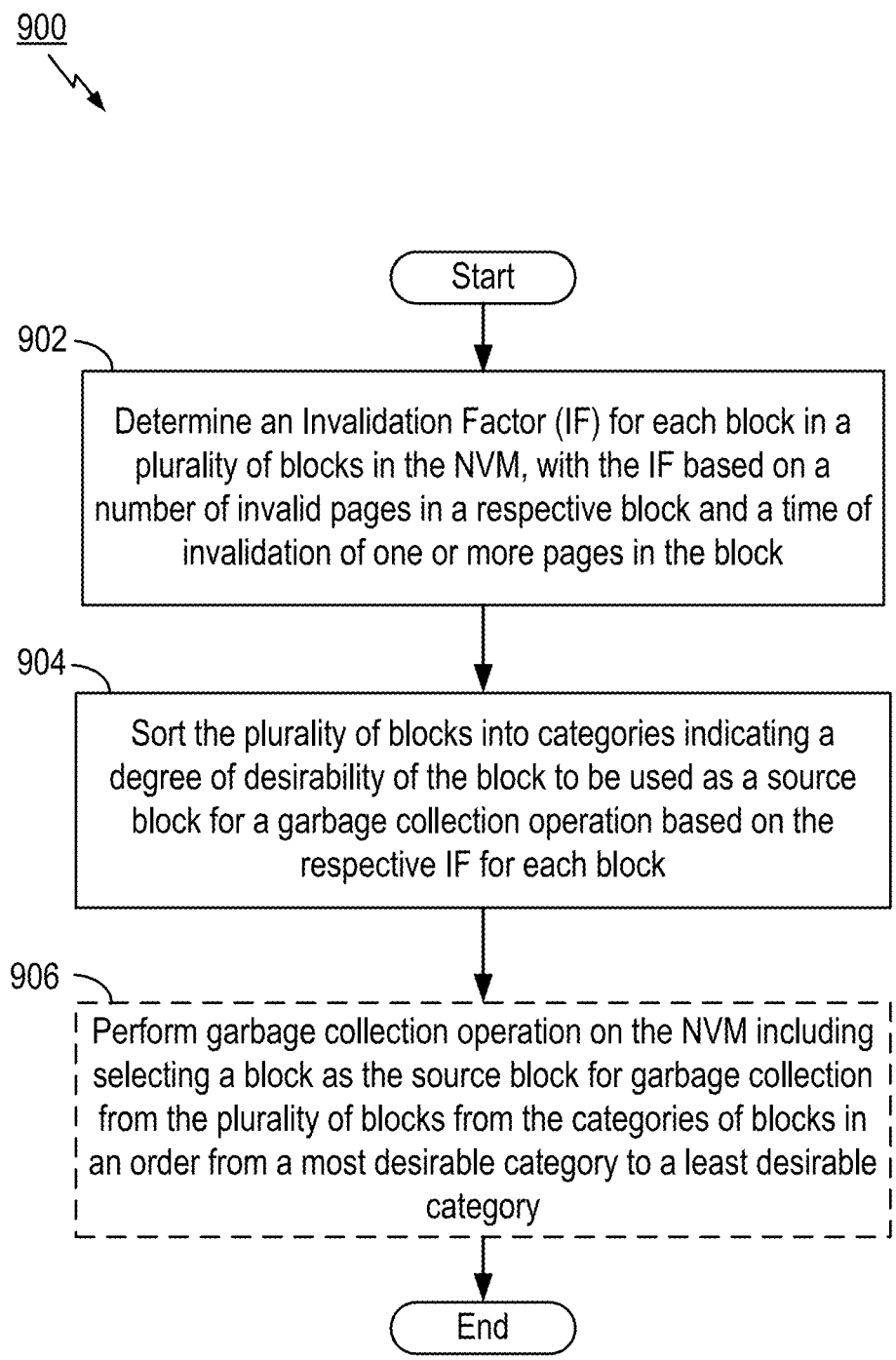
FIG. 9 illustrates a flow diagram of another exemplary method for selecting a source or victim block and for garbage collection including the use of sorting blocks based on an IF factor in accordance with aspects of the present disclosure.

FIG. 9 is a flow diagram of another method 900 for controlling a flash translation layer (FTL) of a non-volatile memory (NVM). The method 900 includes determination of an invalidation factor (IF) for each block in a plurality of blocks in the NVM, where the IF is determined based on number of invalid pages in a respective block and a time of invalidation of one or more pages in the block as shown in block 902. It is noted that the processes of block 902 may be implemented with an FTL (e.g., 306 in FIG. 3), and may also include the use of a table storing the valid pages and most recent time of block invalidation, such as the page count and recency table 500, where the table is stored either in RAM or flash memory. In other aspects, the processes of block 902 may be implemented in an invalidation unit or circuit, such as unit 314 shown in FIG. 3, which may be part of a block manager or a separate unit, circuit, or module. In still another aspect, it is noted that the processes of block 902 may incorporate portions or all of the processes of method 600.

Next, method 900 includes sorting the plurality of blocks into two or more categories indicating a respective degree of desirability of the block to be used as a source block for a garbage collection operation performed by a data storage device controller, as one example, where the sorting is based on the respective invalidation factors for each block as shown in block 904. In aspects, the processes of block 904 may be implemented within a garbage collection circuit, such as circuit 322 in FIG. 3, or within other modules in a data storage device controller or processor such as a block manager (e.g., 314 in FIG. 3). Furthermore, the process of block 904 may employ the use of an invalidation factor table as discussed before, where the table is further configured to have IF values stored sequentially in an order from highest to lowest value, or vice versa in other aspects.

Method 900 further includes performing the garbage collection operation on the non-volatile memory including selecting a block as the source block for garbage collection from the plurality of blocks from the two or more categories of blocks in an order from a most desirable category to a least desirable category as shown in block 906. As discussed above, in an example the most desirable category is cold blocks having an IF value that is greatest, or larger than the IF values for hot blocks, whereas the least desirable category is IF values of the least or lower values. Moreover, the process of selecting the source block in the garbage collection operation will select the block having the highest IF value (i.e., the "coldest" block), but this is not necessarily the case and a cold or warm block might need to be selected in alternative scenarios. Additionally, the operation of block 906 may be implemented by the garbage collector circuit 322, for example, as well as in conjunction with an IF table, such as the IF table discussed in connection with FIG. 8. Furthermore, it is noted that the processes of block 906 may include part or all of the processes shown in FIG. 4.

According to further aspects of method 900, the two or more categories of blocks includes cold blocks having a first degree of access, warm blocks having a second degree of access having greater frequency of access than the first degree, and hot blocks having a third degree of access having greater frequency of access than the second degree, wherein the blocks are chosen for garbage collection in order of most desirable to least desirable in the order of cold, warm, and hot categories. Additionally, it is noted that in some aspects, the plurality of blocks are part of a closed block list.

The method 900 also includes that the time of invalidation is a most recent invalidation time of at least one page in a respective block, such as the recency timestamp values stored in column 506 of table 500. Additionally, the most recent invalidation time is determined based on a timestamp for a respective block, where the timestamp is a difference between a current system time of the memory and a time of invalidation of a page in the block. In still another aspect, method 900 includes the invalidation factor being further based on a percentage of invalid pages that is a ratio of a number of invalid pages in a block to the total number of pages in the block. In still yet a further aspect, each of the plurality of blocks is a metablock comprising one or more physical blocks that are coupled together and configured to provide parallel write and read operations to the metablock.

As will be appreciated by those skilled in the art, by using an invalidation factor to determine cold and hot blocks, as well as prioritizing the selection of cold blocks for garbage collection operations, the presently disclosed methods and apparatus provide improved sustained write performance and block endurance for NVMs due to reduced garbage collection operations. Moreover, NVMs having more efficient garbage collection will result in better cell endurance, which increases the longevity of NVM devices, as well as reducing errors. In other aspects of the present disclosure, it is noted that the presently disclosed apparatus and methods may be incorporated into Compact Flash Express (CFX) products, where data patterns received in the memory device are primarily sequential and some set of host data patterns are always repeating, such as Video Performance Grade, (VPG) or Quick Time video formats. Additionally, the present methods and apparatus may be generally beneficial for memory devices having sequential data patterns as it caters to imaging and video recording solutions but also can be converted to an external drive solution.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method comprising:
   determining an invalidation factor for each block in a plurality of blocks in a non-volatile memory (NVM), wherein the invalidation factor is determined based on a number of invalid pages in a respective block and a most recent time of invalidation of one or more pages in the block, wherein the most recent time of invalidation is based on a difference between a current system time of the NVM and a time of invalidation of at least one page in the respective block, wherein the invalidation factor for the respective block is a product of a percentage of the invalid pages in the respective block and the most recent time of invalidation of the respective block;
   sorting the plurality of blocks into two or more categories indicating a respective degree of desirability of the block to be used as a source block for a garbage collection operation, where the sorting is based on the invalidation factor for each block; and
   performing a garbage collection operation on the NVM including selecting a block as the source block for garbage collection from the plurality of blocks from the two or more categories of blocks in an order from a most desirable category to a least desirable category.

2. The method of claim 1, wherein the two or more categories of the blocks include cold blocks having a first degree of access, warm blocks having a second degree of access having greater frequency of access than the first degree, and hot blocks having a third degree of access having greater frequency of access than the second degree, wherein the blocks are chosen for garbage collection in order of most desirable to least desirable in an order of cold, warm, and hot categories.

3. The method of claim 1, wherein each of the plurality of blocks comprises a closed block.

4. The method of claim 1, wherein the invalidation factor is further based on a percentage of invalid pages that comprises a ratio of a number of invalid pages in a block to the total number of pages in the block.

5. The method of claim 1, wherein each of the plurality of blocks is a metablock linking two or more individual blocks that are identified by a common logical block address.

6. A data storage apparatus comprising:
   a non-volatile memory (NVM); and
   a controller communicatively coupled to a host device and the NVM, and configured to:
   calculate an invalidation factor for each of a plurality of blocks in the NVM, wherein the invalidation factor is determined based on a percentage of invalid pages in a respective block of the plurality of blocks and a most recent time of invalidation of one or more pages in the respective block, wherein the most recent time of invalidation is based on a difference between a current system time of the NVM and a time of invalidation of a page in the respective block, wherein the invalidation factor for the respective block is a product of the percentage of invalid pages in the respective block and the most recent time of invalidation of the respective block;
   classify each block of the plurality of blocks into one of three categories based on the calculated invalidation factor; and
   perform a garbage collection operation for the NVM, wherein the garbage collection operation includes selecting a source block for the garbage collection operation based on the classifications of the plurality of blocks.

7. The data storage apparatus of claim 6:
   wherein the three categories comprise a cold block having a first degree of access by the host device, a warm block having a second degree of access by the host device that has a greater frequency of access than the first degree, and a hot block having a third degree of access by the host device that has a greater frequency of access than the second degree; and
   wherein the controller is further configured to choose blocks for garbage collection operation in order of most desirable to least desirable in an order of cold, warm, and hot categories.

8. The data storage apparatus of claim 6, wherein the plurality of blocks comprises closed blocks.

9. The data storage apparatus of claim 6, wherein the percentage of invalid pages comprises a ratio of a number of invalid pages in a block to the total number of pages in the block.

10. The data storage apparatus of claim 6, wherein each of the plurality of blocks comprises a metablock linking two or more individual blocks that are identified by a common logical block address.

11. An apparatus comprising:
    means for determining an invalidation factor for each block in a plurality of blocks in a non-volatile memory (NVM), wherein the invalidation factor is determined based on a percentage of invalid pages in a respective block and a latest time of invalidation of one or more pages in the respective block, wherein the latest time of invalidation is based on a difference between a current system time of the NVM and a time of invalidation of at least one page in the respective block, wherein the invalidation factor for the respective block is a product of the percentage of invalid pages in the respective block and the latest time of invalidation of the respective block;
    means for classifying the plurality of blocks into two or more categories including cold and hot blocks that are used as a source block for a garbage collection operation, where classifying the plurality of blocks is based on the invalidation factor for each block; and means for performing garbage collection that selects a block as the source block for garbage collection from the plurality of blocks from the two or more categories of blocks in an order from cold to hot blocks.

12. The apparatus of claim 11, wherein the two or more categories of the blocks further include warm blocks, wherein cold blocks have a first degree of access, warm blocks have a second degree of access having greater frequency of access than the first degree, and hot blocks have a third degree of access having greater frequency of access than the second degree, wherein the blocks are chosen for garbage collection in order of cold, warm, and hot categories.

13. The apparatus of claim 11, wherein the plurality of blocks comprises a closed list of blocks.

14. The apparatus of claim 11, wherein the percentage of invalid pages comprises a ratio of a number of invalid pages in a block to the total number of pages in the block.

15. The apparatus of claim 11, wherein each of the plurality of blocks comprises a metablock linking two or more individual blocks that are identified by a common logical block address.

16. An apparatus for controlling a non-volatile memory device, comprising:
- a communications interface configured to provide an interface to the non-volatile memory device; and
- a processor coupled to the communications interface and configured to:
  calculate an invalidation factor for each block in a plurality of blocks in a non-volatile memory (NVM), wherein the invalidation factor is calculated based on a number of invalid pages in a respective block and a most recent time of invalidation of a page in the respective block, wherein the most recent time of invalidation is based on a difference between a current system time of the NVM and a time of invalidation of a page in the respective block, wherein the invalidation factor for the respective block is a product of a percentage of the invalid pages in the respective block and the most recent time of invalidation of the respective block; and
  categorize the plurality of blocks into two or more categorizations indicating a respective degree of desirability of the block to be used as a source block for a garbage collection operation, where the two or more categorizations are based on the invalidation factor for each block.

17. The apparatus of claim 16, wherein the processor is further configured to perform the garbage collection operation on the NVM including selecting a block as the source block for garbage collection from the plurality of blocks from the two or more categorizations of the blocks in an order from a most desirable category to a least desirable category.

18. The apparatus of claim 16, wherein the two or more categorizations of the blocks include cold blocks having a first degree of access, warm blocks having a second degree of access having greater frequency of access than the first degree, and hot blocks having a third degree of access having greater frequency of access than the second degree, wherein the blocks are chosen for the garbage collection operation in order of most desirable to least desirable in an order of cold, warm, and hot categories.

19. The apparatus of claim 16, wherein the invalidation factor is further based on a percentage of invalid pages that comprises a ratio of a number of invalid pages in a block to the total number of pages in the block.

* * * * *